United States Patent [19]
Bickle et al.

[11] Patent Number: 5,758,977
[45] Date of Patent: Jun. 2, 1998

[54] BUSH-LIKE ANTIFRICTION BEARING ELEMENT

[75] Inventors: Wolfgang Bickle, Bailingen; Thomas Storch, Brühl, both of Germany

[73] Assignee: Kolbenschmidt AG, Neckarsulm, Germany

[21] Appl. No.: 792,309

[22] Filed: Jan. 31, 1997

[30] Foreign Application Priority Data

Feb. 3, 1996 [DE] Germany ............... 196 03 929.0

[51] Int. Cl.⁶ ............................................. F16C 17/00
[52] U.S. Cl. .................................. 384/276; 384/905.1
[58] Field of Search ........................ 384/276, 296, 384/439, 905.1, 240, 129, 138, 154, 228, 243, 244–246, 295, 416–419, 420

[56] References Cited

U.S. PATENT DOCUMENTS

| | | | |
|---|---|---|---|
| 596,708 | 1/1898 | Houldsworth | 384/905.1 |
| 1,817,891 | 8/1931 | Claus | 384/905.1 |
| 3,669,518 | 6/1972 | Kohler | 384/240 |
| 4,437,214 | 3/1984 | Olschewski et al. | 29/898.066 |
| 4,784,499 | 11/1988 | Fukute | 384/905.1 |
| 5,035,051 | 7/1991 | Lijima | 384/276 X |

FOREIGN PATENT DOCUMENTS

| | | |
|---|---|---|
| 2278985 | 2/1976 | France . |
| 1422629 | 1/1969 | Germany . |
| 2747382 | 4/1978 | Germany . |
| 3347096 | 8/1984 | Germany . |
| 4243781 | 7/1994 | Germany . |
| 2079872 | 1/1982 | United Kingdom . |
| 2207961 | 2/1989 | United Kingdom . |

*Primary Examiner*—Thomas R. Hannon
*Attorney, Agent, or Firm*—Sprung Kramer Schaefer & Briscoe

[57] ABSTRACT

In order to improve a bush-like antifriction bearing element for mounting a shaft, a pivot or other revolving component so that penetration of dirt into the bearing as well as out of the bearing, the antifriction bearing element is made pot-shaped so that the end of the antifriction bearing element remote from the end for insertion of the shaft, the pivot or the like, is defined by a bottom portion.

7 Claims, 2 Drawing Sheets

BUSH-LIKE ANTIFRICTION BEARING ELEMENT

BACKGROUND OF THE INVENTION

The invention relates to a bush-like antifriction bearing element for mounting a shaft, an axle, a pivot or other revolving component, as well as an antifriction bearing arrangement composed of an antifriction bearing element inserted into a housing through-opening and a shaft journaled therein.

For the mounting of shafts and axles in journals, antifriction bearing elements are used in the form of bushes or flanged bushings, or also in the form of split antifriction bearings which are put together to form a bush bearing. In bush-like antifriction bearing elements the problem arises that abrasively acting substances, such as dirt, detritus or the like enter the bearing from within and there can have a harmful effect. Furthermore, the problem arises that undesired substances, such as lead, grease, or oil, escape from the journal parts. When a bush-like antifriction bearing element is disposed in a through-bore of a housing, the above problems have been countered by inserting or pressing an additional sealing element into the through-bore in order to seal off the bearing. The procedure described is time-consuming and entails high installation costs as well as the cost of the additional sealing element. Another disadvantage is to be seen in the fact that the axial space required for a secure press fit of the additional sealing element in the through-bore is provided either at the expense of the width of the bush or the antifriction bearing element, or the housing wall has to be made correspondingly thicker.

The present invention is based on the problem of improving an antifriction bearing element as well as an antifriction bearing arrangement of the kind described above, with respect to the disadvantages described above.

This problem is solved according to the invention, in an antifriction bearing element of the kind described above, by configuring the latter in a pot shape, so that the end of the antifriction bearing element remote from the end for the insertion of the shaft, pivot or the like is closed by a bottom portion of the element.

The surface of the antifriction bearing element that cooperates with the surface of the shaft or axle is then sealed by the bottom portion from the end remote from the shaft insertion end. It is, however, conceivable for the bottom portion to have a lubrication hole through which lubricant can be supplied to the bearing if this is desired in a particular case.

Although the configuration of the bottom portion of the antifriction bearing element is not obligatory, if the end remote from the shaft is defined by the bottom portion, it proves to be space-saving and therefore advantageous if the bottom portion is substantially perpendicular to the axis of the bush.

The antifriction bearing element according to the invention could be, for example, a turned or rolled bush on which a bottom portion is formed in any desired manner. In the case of turned bushes the possibility also exists for creating the bush interior by boring a rod-like blank, leaving the bottom portion. In an especially preferred embodiment of the invention, however, the antifriction bearing element is deep-drawn. To make the antifriction bearing element a disk is punched from a strip of flat material, and is deep-drawn in several draws, thus forming the pot-like, bowl-like or hat-like shape.

The antifriction bearing element can consist of a solid material or a monomaterial, but it can also be sandwich-like. In the latter case the antifriction bearing element can include a metal rest flange with a lubricant coating applied to it. However, it can comprise a film material, e.g., in the form of a fabric or knit material impregnated with plastic.

In the case of an antifriction bearing arrangement of the kind referred to above, the problem is solved by using an antifriction bearing element according to the invention, in which the end of the housing through-bore remote from the shaft is closed by the bottom of the antifriction bearing element or sealed against the bearing part.

The antifriction bearing element is preferably pressed into the through-bore from the end remote from the shaft, so that, while maintaining the usual standards for the configuration of the connected parts, the friction heat can be conducted to the housing and also to the shaft.

It may furthermore prove advantageous if the housing through-bore has a countersunk bore for the defined accommodation of the antifriction bearing element.

According to another advantageous embodiment of the invention, the antifriction bearing element has a hat-brim-like bead portion or flange portion on the end remote from the bottom. This bead portion or flange portion can serve to support the antifriction bearing element.

Additional features, details and advantages of the invention will be found in the appended claims as well as the drawing and the following description of two preferred embodiments of the invention, wherein:

DETAILED DESCRIPTION OF THE INVENTION

Figure 1:
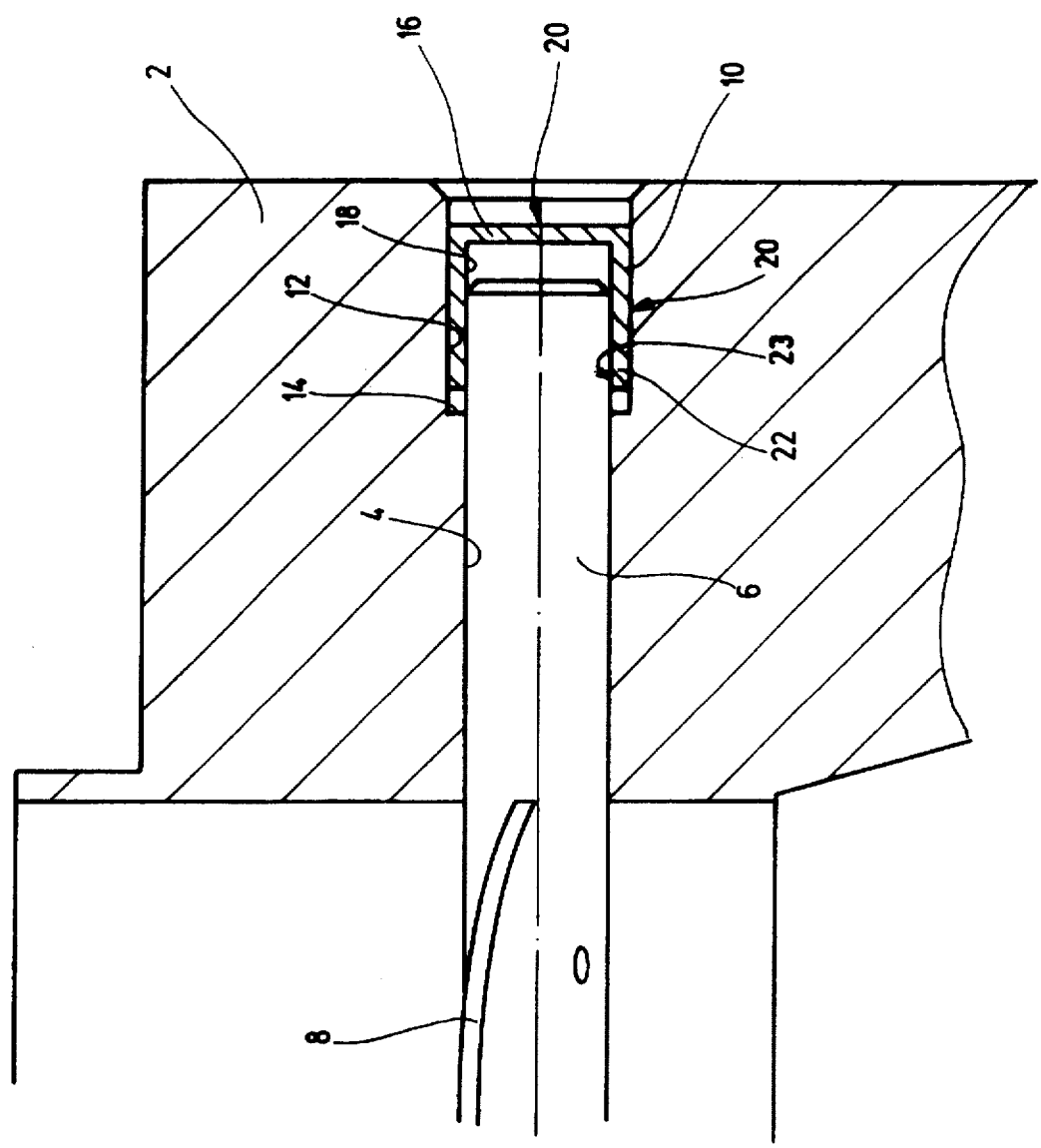
FIG. 1 shows a first antifriction bearing arrangement according to the invention, and FIG. 2 a second antifriction bearing arrangement according to the invention.

FIG. 1 shows a portion of a wall 2 of a motor vehicle carburetor. In the wall 2 there is formed a through-bore 4 in which a choke valve shaft 6 bearing a choke valve indicated by the reference number 8, is journaled. For this purpose an antifriction bearing element 10 of pot-shaped cross section is provided, which is pressed into the bore 4 from the end of the bore remote from the shaft 6. For this purpose the bore 4 has a prolongation 12 which forms an abutment 14 for the antifriction bearing element 10. The antifriction bearing element 10 comprises a metal base 16 with an antifriction coating 18. The antifriction bearing material can be, for example, a material made and sold by the applicant under the trademark name "Permaglide," although the invention is not restricted thereto.

For the preparation of the pot-shaped antifriction bearing element a strip to be made in a manner known in itself is punched to produce a disk. The disk is then deep-drawn, preferably in a plurality of draws, by means of various deep-drawing tools of diminishing diameter until the cup-like shape represented is formed with a bottom 20 and a cylindrical skirt 22. The inner skirt surfaces 23 form the antifriction surfaces and assume the bearing function, while the bottom 20 of the antifriction bearing element 10 serves to seal the bearing.

Figure 2:
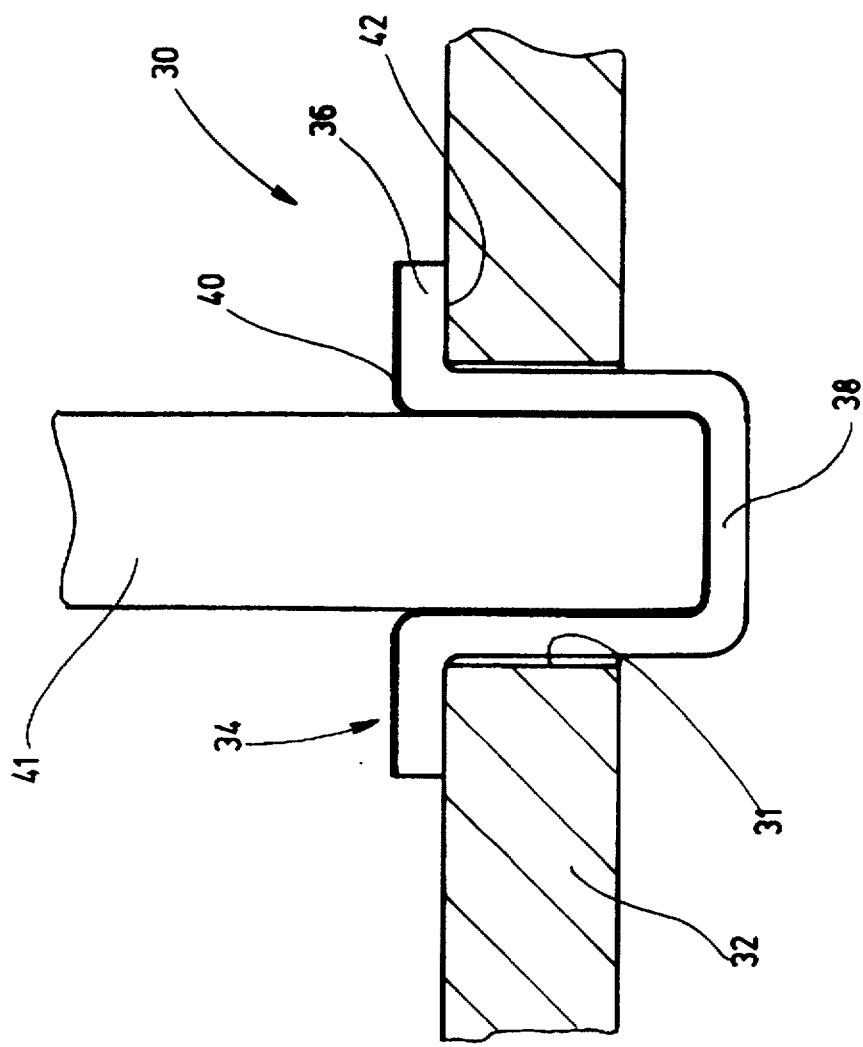

Another antifriction bearing 30 according to the invention is shown in FIG. 2. A cup-shaped antifriction bearing element 34 having a hat-brim-like portion or flange portion 36 at the end of the antifriction bearing element remote from the bottom 38 is inserted into an opening 31 in a housing wall identified by the reference number 32. The antifriction bearing element 34 rests with the side 42 of the flange portion 36 that does not bear the antifriction coating 40, against the housing wall 32. The reference number 41 identifies a shaft. To produce the flange portion 36, the antifriction element 34, which was deep-drawn in several stages, was turned outward with a flaring tool.

We claim:

1. An antifriction sliding bearing arrangement comprising: a pot-shaped antifriction bearing element having a closed bottom portion having an outer surface and an open top portion having a shaft-receiving open end; a housing throughbore having a countersunk bore in one end forming an abutment step between the one end and another end; wherein the open top portion of the bearing element is sealingly pressed into the one end of the throughbore such that the shaft-receiving open end rests against the abutment step and the outer surface of the bottom portion is countersunk below the one end of the throughbore, thereby sealing the one end of the throughbore from the other end thereof; and a shaft having one end mounted in the shaft-receiving open end of the bearing element.

2. The antifriction sliding bearing arrangement according to claim 1, wherein the pot-shaped antifriction bearing element comprises a deep drawn part.

3. The antifriction sliding bearing arrangement according to claim 1, wherein the pot-shaped antifriction bearing element comprises one of a massive material and a mono-material.

4. The antifriction sliding bearing arrangement according to claim 1, wherein the pot-shaped antifriction bearing element comprises a metal support with a lubricant coating thereon.

5. The antifriction sliding bearing arrangement according to claim 4, wherein the pot-shaped antifriction bearing element comprises one of steel, brass and aluminum.

6. The antifriction sliding bearing arrangement according to claim 4, wherein the lubricant coating comprises one of a plastic material, aluminum, brass and bronze.

7. The antifriction sliding bearing arrangement according to claim 1, wherein the pot-shaped antifriction bearing element comprises a film material.

* * * * *